Figure 1:
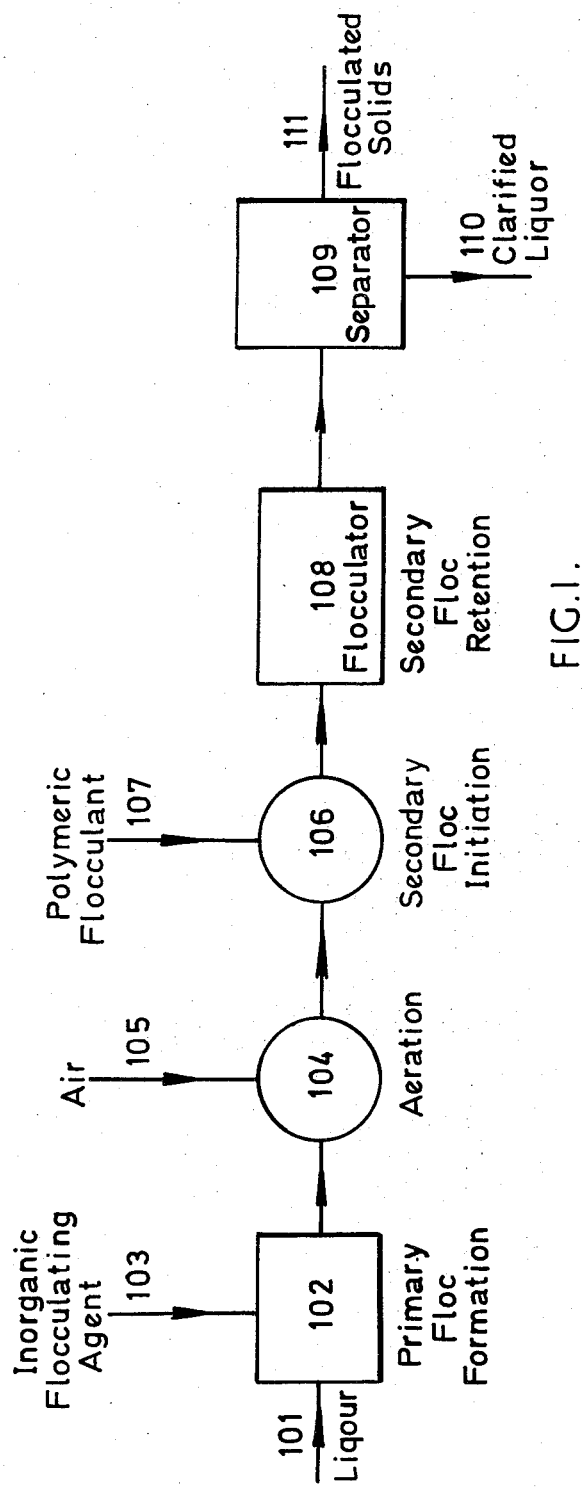

United States Patent [19]
Rundell et al.

[11] 3,834,541
[45] Sept. 10, 1973

[54] APPARATUS FOR THE SEPARATION OF SUSPENDED SOLIDS FROM LIQUIDS

[75] Inventors: John Trethowan Rundell, Keston; Paul Richmond Pottage, Stockton, England

[73] Assignee: Tate & Lyle Limited, London, England

[22] Filed: June 19, 1972

[21] Appl. No.: 263,785

[30] Foreign Application Priority Data
June 22, 1971 Great Britain .................. 29223/71

[52] U.S. Cl. .................. 210/219, 209/169, 210/221, 261/123
[51] Int. Cl. .............................................. B03d 1/24
[58] Field of Search ........................ 209/168–170; 210/44, 220, 221, 42, 49, 219, 540; 261/77, 85, 123

[56] References Cited
UNITED STATES PATENTS
2,296,437 9/1942 Green ............................ 210/220 X
2,429,316 10/1947 Green ............................ 210/42 X
3,147,217 9/1964 Halton ............................... 210/44
3,179,252 4/1965 Vrablik ........................... 210/44 X
3,192,155 6/1965 Bready et al. ..................... 210/44
3,505,188 4/1970 Pan .............................. 210/221 X
3,542,675 11/1970 Mail et al. ..................... 210/221 X FOREIGN PATENTS OR APPLICATIONS
1,912,306 10/1969 Germany ........................... 209/168

Primary Examiner—Charles N. Hart
Assistant Examiner—Robert H. Spitzer
Attorney, Agent, or Firm—Ostrolenk Faber Gerb & Soffen

[57] ABSTRACT

Apparatus for separating flocculated solids from a liquid by flotation-clarification comprises: a separator chamber; a flocculator chamber centrally located within the separator chamber; a trough surrounding the top of the separator chamber; liquid inlet means located at the bottom of the flocculator chamber; liquid agitating means located within the flocculator chamber; means allowing floc-containing liquid to flow with minimal agitation from the top of the flocculator chamber into the separator chamber; means for transferring floating flocculated solids from the top of the separator chamber to the trough; and solids outlet means located at the bottom of the trough.

8 Claims, 2 Drawing Figures

FIG. I.

APPARATUS FOR THE SEPARATION OF SUSPENDED SOLIDS FROM LIQUIDS

This invention relates to the separation of suspended solids from liquids. The invention has particular relevance to processes used in the manufacture of sugar, but is not limited to this field.

In many industrial processes, it is at some stage necessary to separate out finely divided solids suspended in an aqueous liquid, either for the purpose of recovering the solid or so as to purify the liquid. For example, this operation is needed during many manufacturing processes, for treating slurries of the product or aqueous waste liquors, in the treatment of various industrial effluents, and in sewage treatment. Frequently, the suspended solid particles are so fine that they cannot easily or economically be separated from the liquid unless they are caused to agglomerate into flocs, for instance, by the addition of a chemical flocculant. In some circumstances, a flocculent precipitate may be formed in a liquor to scavenge suspended or dissolved impurities, such as those which give rise to colour or turbidity in aqueous liquors.

The use of chemical flocculating agents, including polymeric flocculants such as polyacrylamides, is well known. However, mere admixture of such flocculants with an aqueous liquor containing finely-divided suspended solids will not necessarily give rise to the efficient flocculation which is needed in order to achieve subsequent rapid and complete clarification of the liquor. It has now been discovered that a particular sequence of steps must be followed in order to achieve optimum flocculation of the suspended solids and efficient clarification of the liquor. The present invention provides a process which follows this sequence of steps and an apparatus which allows this process to be carried out in a particularly advantageous way.

The apparatus of the invention is applicable to a process for separating suspended solids from an aqueous liquor, which process comprises: forming a primary floc in the liquor containing suspended solids; aerating the liquor containing the primary floc, with agitation; distributing an organic polymeric flocculant uniformly throughout the liquid phase of the aerated liquor, to initiate the formation of a secondary floc therein; retaining the resulting mixture in a flocculator vessel with nonturbulent agitation preventing the segregation of the secondary floc from the liquor and allowing the secondary floc to grow; transferring the liquor, with minimal agitation, from the flocculator vessel to a separator vessel; allowing the secondary floc to segregate by flotation from the liquor in the separator vessel; and separately removing clarified liquor and flocculated solids from the separator vessel.

The invention is applicable to a wide range of processes requiring the separation of suspended solids from an aqueous liquid, for example, in brewing, water purification treatments, the treatment of sewage and industrial effluents, and mineral ore separation processes. However, the invention is particularly useful for separating suspended solids from sugar liquors, syrups or juices, during the various stages of sugar manufacture; and it is, therefore, convenient to describe it in detail with particular reference to the processes used in sugar manufacture.

The production of sugar for human consumption generally comprises two distinct operations, namely the production of raw sugar and the production of refined sugar, which are often carried out in geographically separate locations. Raw sugar is manufactured from "raw juice," obtained from sugar cane or sugar beet, by clarification (i.e., removal of suspended solids), evaporation to a thick syrup, and crystallization. If special processing is introduced into these stages, the crystallized product can reach a standard suitable for direct consumption and is then known as Mill White or Plantation White sugar; but generally raw sugar must be refined before it reaches an acceptable standard of purity. In the conventional sugar refining process, raw sugar is first washed and centrifuged to remove adherent syrup, and the affined sugar so produced is dissolved in water as "melter liquor." The melter liquor is then purified in two successive steps, the first of which is termed "defecation" and prepares the liquor for the second step, which is termed "decolorization." The liquor produced by these successive steps is termed "fine liquor;" and refined sugar is obtained from fine liquor by crystallization. When a relatively low quality refined sugar product is required, the decolorization step may be omitted altogether.

The defecation step may comprise simple filtration through a bed of diatomaceous earth or another suitable filter aid; but, more generally, defecation involves an inorganic precipitation reaction, whereby insoluble and colloidal impurities are removed along with the inorganic precipitate. The inorganic precipitate employed may be calcium carbonate, formed by dissolving lime in the melter liquor and introducing carbon dioxide (for example, in flue gas), which causes the in situ precipitation of calcium carbonate: this is called the "carbonatation process" and the precipitate, which contains various impurities, is removed by filtration, the calcium carbonate acting as its own filter aid. Alternatively, the inorganic precipitate may be calcium phosphate, for example, formed by the addition of phosphoric acid and lime, in which case the process is termed "phosphatation". This flocculent precipitate can also be removed by filtration, but large quantities of filter aid are required, consequently, it is more common to remove the calcium phosphate precipitate by flotation, in association with air bubbles. Many chemical additives have been recommended to aid flotation separation of the phosphatation precipitate, including high molecular weight anionic polymers of the polyacrylamide type, which increase the size of the floc and the retention of air bubbles within it.

A third inorganic precipitate occasionally used for defecation is calcium sulphite, formed by the introduction of sulphur dioxide into limed melter liquor: the calcium sulphite is then removed by filtration, as in the carbonatation process. This process, which is termed "sulphitation," is often used in conjunction with carbonatation.

When the invention is used in sugar refining, the primary floc is a flocculent precipitate such as that produced by phosphatation. Similar precipitation and separation techniques are used in the clarification of sugar juice, and the apparatus of the invention may correspondingly be used for the removal of suspended solids from juice, also. When the invention is used for the treatment of other types of aqueous liquors, various other reagents may be used to form the primary floc, as dictated by the nature of the process. For example, primary flocculation agents which may be used when the invention is applied to water purification treatments or sewage treatment include calcium hydroxide, aluminium sulphate, ferrous sulphate, ferric sulphate and activated silica. Such flocculation aids and their manner of use are well known per se in their respective fields of application.

During the subsequent aeration step, the retention of fine air bubbles in the primary floc can be improved by the addition of a surface active agent to the aqueous liquor. To this end, various well known cationic, anionic and non-ionic surfactants can be added to the liquor between the steps of primary floc formation and aeration. For example, U.S. Pat. No. 3,166,442 describes the use of organic amine cationic surfactants for improving the separation of a phosphate floc from sugar liquor by flotation, and surfactants are similarly used to aid flotation separation in mineral ore suspensions. However, when the invention is used for the treatment of sugar liquors, it is preferred to add a cationic surfactant before primary floc formation, which not only aids the subsequent retention of air bubbles in the floc but also acts specifically to remove impurities dissolved in the sugar liquor. Conventionally, defecated sugar liquors have been decolorized by means of adsorbent materials such as bone char, granular carbon, powdered activated adsorbent carbon, or ion-exchange resins. However, it has been discovered that dissolved anionic high molecular weight impurities, including the colorant impurities, can be precipitated from sugar melter liquors by adding a cationic surfactant, which forms an insoluble complex with the impurities, this use of cationic surfactants for the purification of sugar liquors is the subject of British Pat. No. 1,224,990. The insoluble complex is initially precipitated as a fine suspension in the sugar liquor; and, although the precipitate can simply be filtered from the purified liquor, it can be removed more effectively by means of the conventional defecation treatment already described, in which the inorganic precipitate formed in the liquor acts as a scavenging system for the complex and other suspended matter. Examples of suitable cationic surfactants are given in British Pat. No. 1,224,990, long hydrocarbon chain quaternary ammonium compounds being preferred, especially dialkyl dimethyl quaternary surfactants such as dioctadecyl and dihexadecyl dimethyl ammonium chlorides, and in particular that available under the Trade Mark "TALOFLOC." Accordingly, in this preferred embodiment of the invention for the treatment of sugar liquors, first a cationic surfactant is added, to form an insoluble complex with dissolved anionic high molecular weight impurities, then a primary flocculent precipitate is formed in the presence of this insoluble complex, and the liquor containing the primary floc is aerated. Of course, it is also possible to add cationic surfactants to other types of liquor before primary floc formation, or to use anionic or non-ionic surfactants at this stage, merely to aid the retention of air bubbles in the subsequent aeration step, without the specific action of cationic surfactants in sugar liquors.

The aeration of the liquor containing the primary floc can be achieved by blowing in air under pressure, by venturi suction into a pipe through which the liquor is flowing, or by releasing air already present in the liquor, for example, mechanically or by heating the liquor. The air bubbles should be thoroughly broken up and mixed into the liquor, to produce a fine dispersion of air bubbles therein and ensure satisfactory subsequent aeration of the floc. This can be achieved, for example, in the case of a melter liquor by using a centrifugal pump with an open impeller, operating at a tip speed of about 100 feet per second.

An organic polymeric flocculant is then added to the aerated liquor. Such polymeric flocculants are well known per se; particularly suitable are the high molecular weight anionic polyacrylamide flocculating agents, such as that sold under the Trade Mark "TALOFLOTE." For most applications, it will be satisfactory to use from 1 to 40 ppm by weight (grams) of flocculant on the volume (ml) of aqueous liquor. Specifically, when the invention is used for sugar manufacture, the preferred range for juice is 1 to 10 ppm by weight on juice volume, and for remelt liquor it is 1 to 20 ppm, most preferably 5 to 15 ppm by weight, on the solids content of the liquor. The manner in which the polymeric flocculant is added to the liquor to be treated can significantly affect the success of the subsequent steps. Thus, the flocculant should be used in the form of a dilute aqueous solution or suspension, say having a concentration of 0.025 to 0.25 percent w/v (grams/ml), preferably 0.05 to 0.15 percent w/v, since a greater dispersion of the polymer molecules allows better utilization of the full activity of the flocculant. The flocculant solution or suspension should not be subjected to vigorous mechanical treatment, such as high speed agitation, which can rupture the polymer molecules; instead, an air stream or low speed stirrer can be used to disperse the polymer. The flocculant solution or suspension should be "aged" for a few hours before use, to aid dispersion, but should not be kept for longer than about one day otherwise fragmentation of the polymer molecules can occur, generally, aging for 2 to 3 hours is satisfactory.

The satisfactory distribution of the polymeric flocculant in the liquor to be treated is also important. This can be difficult, especially in viscous liquors such as the high Brix liquors encountered in sugar refining. On the one hand, good distribution of the flocculant cannot be achieved by merely dosing it into a volume of the liquor; whilst, on the other hand, violent mixing, such as produced in some in-line mixers or by passing the mixture through a centrifugal pump, is also unsatisfactory. Thus, although good mixing is desirable so that the flocculant is well dispersed throughout the liquor, it has been found that too vigorous a mixing leads to loss of flocculant activity. The degree of dispersion of the flocculant molecules in the liquor will depend on the intensity and duration of mixing. For instance, the right degree of dispersion is achieved by a degree of turbulence corresponding to Reynolds numbers from 3,000 to 20,000, preferably 5,000 to 10,000, for a period of about 1 second. In practice, this satisfactory mixing can be achieved by dosing the flocculant through a metering pump into the liquor flowing with a linear velocity of from 4 to 8 feet per second, preferably about 5 feet per second, in a pipe of appropriate bore; but the right degree of mixing can also be obtained in other ways, such as by causing the liquor to flow through a pipe containing two or three rightangle bends in it.

An alternative method of achieving the right degree of distribution of the flocculant in the aqueous liquor involves pre-mixing the flocculant solution or dispersion with a small fraction, say 2–10 percent, of the clarified liquor being produced by the process of the invention. Because the clarified liquor does not contain growing flocs, it can be subjected to more vigorous mixing than the untreated liquor, for example, using an in-line flow mixer. The pre-mix is then added to the untreated liquor and distributed through it by gentle mixing. This procedure has the advantage that the flocculant can be used at high dilutions without having to add large quantities of water to the process liquors.

It is an important feature of the invention that the mixture of the liquor containing the primary floc and the polymeric flocculant is then retained for a period of time in a flocculator vessel, under conditions of reduced linear velocity. In the flocculator vessel, the eddy currents and shearing forces imposed on the liquor during its mixing with the flocculant are allowed to die down, but a gentle nonturbulent agitation is maintained in the liquor so as to prevent the segregation of the flocs; this can be provided by a slowly rotating stirrer, for example, having a tip speed of from 1 to 5 feet per second, or by appropriate design of the flow of liquor through the vessel. It has been found that the flocculation is greatly improved by retaining the floc within the body of the liquor for a short period of time under quiescent conditions, before allowing it to separate out; it is thought that this retention time is needed for the flocculant molecules to become fully loaded with solid particles, and thus achieve the maximum degree of flocculation. The optimum retention time in the flocculator vessel will depend on the specific flocculant and system in which it is being used, as well as other operating conditions; but generally, retention times from 15 seconds to 5 minutes may be used, and times from 30 seconds to 3 minutes are preferred.

The liquor containing the flocs is transferred from the flocculator vessel to a separator vessel, in which the flocs are allowed to segregate from the liquor. The liquor should be subjected to a minimum of shear and agitation during the transfer, to avoid redispersal of the flocs. In the separator vessel, the flocs of solid material are allowed to separate out from the liquid, and the flocculated solids and clarified liquor are removed separately. The flocs float to the top, and the clarified liquor is removed from the bottom. The separator vessel can be a conventional clarifier of one of the many known designs with a flocculator vessel of suitable capacity connected in its influent feed, so as to provide the desired residence time for the liquor. However, a preferred apparatus is provided in accordance with the invention, in which the flocculator and separator vessels comprise two separate chambers within the body of the clarifier. Particularly good flow characteristics can be achieved by having a central flocculator chamber, surrounded by the separator chamber. In this particular construction, the feed liquor containing the flocculant flows into the flocculator chamber situated within the clarifier and is gently mixed for the required residence time; and the floc-containing liquor thereafter overflows into the main body of the clarifier, or separator chamber, where separation of the flocs takes place. In this way, the transfer of the liquor from the flocculator chamber into the separator chamber occurs with a minimum amount of shear. The design of the separator chamber will depend upon the type of process being operated and may be similar to conventional clarifier designs.

Accordingly, the invention also provides an apparatus for separating flocculated solids from a liquid by flotation-clarification, which is particularly suitable for performing the retention and separation steps of the process hereinbefore described, and which comprises: a separator chamber; a flocculator chamber centrally located within the separator chamber; a trough surrounding the top of the separator chamber; liquid inlet means located at the bottom of the flocculator chamber; liquid agitating means located within the flocculator chamber; means allowing floc-containing liquid to flow with minimal agitation from the top of the flocculator chamber into the separator chamber; means for transferring floating flocculated solids from the top of the separator chamber to the trough; and solids outlet means located at the bottom of the trough.

Figure 2:
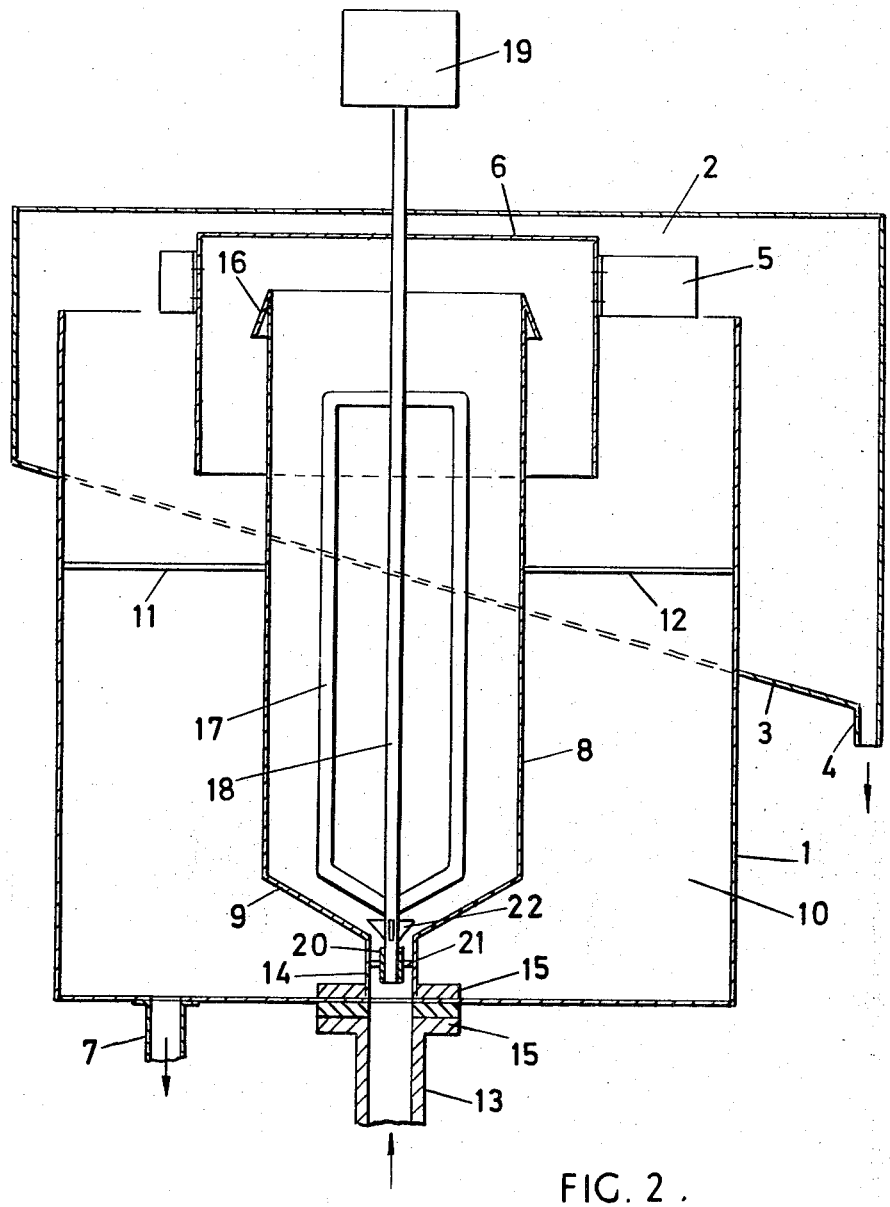

The invention will be further described with reference to the accompanying drawings, in which:

FIG. 1 is a flow diagram illustrating the various steps of the process of the present invention; and FIG. 2 shows a diagrammatic cross-section through a clarifier of the preferred type, incorporating a flocculator chamber and a separator chamber within the same apparatus.

In FIG. 1, 101 is the liquor containing suspended solids to be treated by the process. For example, this may be a sugar liquor containing an insoluble complex of anionic high molecular weight impurities, produced by the addition of a cationic surfactant, in the manner already described. At 102, the liquor is treated with inorganic flocculating agent 103. For example, in the case of the phosphatation of sugar liquor, this step comprises the addition of phosphoric acid and lime, to produce a calcium phosphate floc in the liquor. Air, 105, is fed into the liquor and thoroughly mixed with it, for example by an open-impeller pump, 104. A polymeric flocculant 107, for example, an anionic polyacrylamide, is dosed into the liquor stream by means of a metering pump at 106, to initiate secondary floc formation. The liquor then flows into the flocculator 108, for the secondary floc retention step, and thence into the separator 109, from which clarified liquor 110 and flocculated solids 111 are separately removed. The flocculator 108 and separator 109 may constitute two chambers inside a single apparatus, as in the preferred design of clarifier shown in FIG. 2 of the drawings.

The clarifier shown in FIG. 2 of the drawings is suitable, for example, for the phosphatation-flotation process of sugar refining. The clarifier comprises a generally cylindrical open-topped tank 1. Surrounding the top of the clarifier is an annular trough 2 having a sloping bottom 3 and provided with a solids outlet 4 at its lowest point. Also mounted at the top of the clarifier is scum scraper blade 5 and liquid deflector cap 6. A clarified liquor outlet pipe 7 is provided at the bottom of the clarifier. Mounted centrally within the clarifier is a flocculator chamber 8 which has an inverted conical bottom 9, and surrounding the flocculator chamber is a separator chamber 10. The chamber 8 is held steady within the clarifier tank by means of stabilizing bars 11 and 12. Liquor feed pipe 13 communicates with inlet 14 of the flocculator chamber via watertight flanges 15 mounted in the bottom of the clarifier. The top of the flocculator chamber is provided with an anti-shear lip 16. Inside the flocculator chamber, a stirrer 17 is mounted on shaft 18, which is driven from the top by stirrer motor and gearing 19. At the bottom, the stirrer shaft is carried in bearing sleeve 20, supported by bearing support webs 21 attached to the sides of the inlet 14. Baffle flow distributors 22 are mounted just above the bearing sleeve 20, to smooth out the flow of liquid entering the flocculator chamber. The motor 19 also rotates the liquid deflector cap 6 and scum scraper blade 5; and, preferably, intermediate gearing is provided (not shown in the drawing), so that these rotate at a slower speed than the stirrer.

In operation, the liquor containing the organic polymeric flocculant is fed into the clarifier by means of feed pipe 13 and flows upwardly into the flocculator chamber 8, in which it is agitated by stirrer 17. The degree of agitation should be sufficient to keep the growing flocs mixed with the liquor, but not vigorous enough to cause turbulence or break up the flocs. The optimum stirring speed will thus depend upon the size and design of the apparatus, and the nature of the liquor being treated, and may be determined by routine tests, but will normally be such as to give a tip speed of below 5 feet per second. After a residence time within the flocculator chamber, the floc-containing liquor flows out of the top of the flocculator chamber, over the anti-shear lip 16, into the separator chamber 10. In the separator chamber, the flocs rise to the top of a liquid as a scum and are pushed into the trough 2 by scraper blade 5 which is rotated slowly, say at 1 r.p.m., by motor 19. The solid material is removed from the trough 2 via solids outlet 4; and the clarified liquor is removed from the bottom of the separator chamber via liquid outlet 7.

In FIG. 2, the liquid deflector cap 6 and anti-shear lip 16 provide the means for allowing the floc-containing liquid to flow with minimal agitation from the top of the flocculator chamber 8 into the separator chamber 10. However, the same effect can be achieved if the cap 6 is replaced by an open-topped annular sleeve; but alternative means must then be provided for supporting and driving the scum scraper blade 5. Alternatively, the cap 6 and lip 16 can be replaced by a multiplicity of conduits symmetrically disposed outside the top of the flocculator vessel 8, to channel the liquid flow from the flocculator vessel smoothly into the separator vessel, below the top of the scum layer in the latter. Such conduits may be formed by baffles surrounding depressions or apertures in the top edge of the flocculator vessel.

As an alternative to the bar stirrer 17 driven by motor 19 shown in FIG. 2, the agitation in the flocculator vessel can also be provided by making the liquid flow through a suitably arranged series of static baffles.

Although only one liquid outlet 7 is shown in FIG. 2, in practice it is preferred to have a ring main or common manifold communicating with several such outlets symmetrically disposed around the bottom of the separator vessel 10; for example, a small clarifier, may have three liquid outlets, and a large clarifier six outlets.

The size of the apparatus will be dictated by the desired process throughput. It is generally inconvenient for the separator chamber to have a depth much in excess of 5 feet; and, therefore, it is preferred to increase the diameter of the apparatus in order to obtain larger throughputs, once the depth has reached this limit. On the other hand, the flocculator chamber should preferably have a height to diameter ratio of at least 2:1, and most preferably at least 3:1, since otherwise it is difficult to maintain plug flow in the flocculator chamber and to achieve satisfactory mixing with a bar stirrer such as shown in FIG. 2 In a clarifier of large dimensions, the opposing desiderata of a shallow separator chamber and a tall flocculator chamber can be reconciled by extending the flocculator chamber below the bottom of the separator chamber, instead of having it above the bottom of the separator chamber as in FIG. 2.

An important advantage of the invention is that it achieves much faster separation the flocs from the liquor than conventional clarification processes. This may be demonstrated by referring again to the sugar refining process using phosphatation-flotation. In conventional refining processes using this technique, the residence time of the sugar liquor in the clarifier is typically from a half to one hour. In marked contrast to this, comparable clarification of the sugar liquor by the process of the invention can be achieved with a clarifier residence time of 5 to 10 minutes. It will readily be appreciated that this sharply reduced residence time permits the use of smaller clarifiers for a given volume of sugar liquor, thus reducing plant and processing costs. Table 1 gives typical dimensions for a clarifier as shown in FIG. 2 of the drawings, for use in sugar refining, with four different throughputs, on the basis of a 10 minute liquor residence time.

Table 1

| Height (feet) | Separator diameter (feet) | Flocculator diameter (feet) | Throughput (tons melt sugar/hour) |
|---|---|---|---|
| 4.0 | 5.1 | 1.3 | 10¾ |
| 4.5 | 6.8 | 1.7 | 22½ |
| 5.0 | 9.2 | 2.3 | 45 |
| 5.5 | 12.4 | 3.1 | 90 |

The invention is illustrated by the following Examples, in which all parts are given by weight unless otherwise specified.

Example 1

This example illustrates the process of the invention as used in the phosphatation-flotation process of sugar refining, without the preliminary addition of a cationic surfactant.

The process used was as illustrated in the flow diagram of FIG. 1 of the drawings. The starting liquor (101 in FIG. 1) was a 100 percent Jamaican sugar melter liquor, flowing at a rate of 500 ml per minute, with a concentration of 65° Brix and a temperature of 80°C. At 102 in the flow diagram, a phosphate primary floc was formed by the addition of phosphoric acid and lime as the inorganic flocculating agent 103. Various concentrations of phosphoric acid were used in different runs, corresponding to $P_2O_5$ concentration of from 100 to 600 ppm on the basis of the sugar solids. A run was also conducted with zero concentration of phosphoric acid, i.e., without any phosphate floc formation, as a control.

After the aeration step 104 using a 3 inch diameter stirrer rotating at 6,000 r.p.m., the liquor was dosed with 10 ppm (on the basis of sugar solids) of TALOFLOTE anionic polyacrylamide flocculating agent by pumping the agent in the form of an aqueous solution containing 0.1 gm of flocculant per 100 ml of solution into the liquor stream, to initiate secondary floc formation.

The liquor was then retained in the flocculator 108 before flowing to the separator 109. A laboratory-scale version of the apparatus shown in FIG. 2 of the drawings was used, comprising a flocculator chamber mounted within the separator chamber of the clarifier. The separator chamber was a cylindrical vessel 24 cm in diameter and 24 cm high, having a total volume of 9.8 litres and a working liquid volume (i.e., total volume less working scum volume) of 8.4 litres. The internal flocculator chamber was a cylindrical vessel 6 cm in diameter and 25.5 cm high. The flocculator stirrer was driven at 350 r.p.m. (corresponding to a tip speed of 79 cm/second) and the scum scraper at 1.2 r.p.m.

The purity of the liquor emerging from the separator chamber of the clarifier was measured in terms of its attenuation index at 420 nm ($a^*_{420}$) in milliabsorbency units (mau). The attenuation index of the liquor was again measured after Millipore filtration, using 450 nm pore diameter membranes under vacuum, so as to measure the colour of the liquor. Measurements were made in accordance with Method 4 of the International Commission for Uniform Methods of Sugar Analysis, using the "TALAMETER" (Trade Mark) colorimeter with a 1 cm cell, on liquors adjusted to pH 7.5. The "Turbidity Index" was derived from these measurements, by subtracting the value of the colour measurement from that of the first attenuation index measurement. The percentage decolorization was also calculated, on the basis of the colour of the liquor in the control run, which had not been subjected to phosphatation.

The results obtained are shown in Table 2.

The liquor was then subjected to phosphatation, aeration, secondary floc formation and clarification in exactly the same manner as in Example 1. The attenuation index, colour, turbidity index and percentage decolorization were assessed as described in Example 1.

The results obtained are shown in Table 3. It will be immediately evident that the decolorization achieved is consistently better than under the corresponding conditions in Example 1, demonstrating the specific activity of the cationic surfactant for the purification of sugar liquors.

Table 3

| Phosphate Level (ppm $P_2O_5$) | Attenuation Index ($a^*_{420}$ in m.a.u.) | Colour ($a^*_{420}$ after Millipore filtration in m.a.u.) | Turbidity Index (Attenuation Index − Colour) | Percentage Decolorization |
|---|---|---|---|---|
| 0 | 2485 | 1350 | 1135 | — |
| 100 | 1430 | 659 | 771 | 51 |
| 200 | 920 | 623 | 297 | 54 |
| 300 | 754 | 604 | 150 | 55 |
| 400 | 685 | 611 | 74 | 55 |
| 500 | 659 | 596 | 63 | 56 |
| 600 | 655 | 598 | 57 | 56 |

Example 3

This Example illustrates the effect of retaining the secondary floc within the liquor for a period of time before separation, as applied to the phosphatation-flotation process of sugar refining.

A sugar melter liquor as used in Examples 1 and 2, having a concentration of 65° Brix, was treated with 500 ppm of "TALOFLOC" (Trade Mark) surfactant. The liquor was then subjected to phosphatation at 85°C and pH 7.5, at a phosphate level corresponding to 250 ppm of $P_2O_5$, and aerated. Samples of the liquor were dosed, respectively, with 5 and 10 ppm of "TALOFLOTE" (Trade Mark) anionic polyacrylamide flocculant (in the form of an aqueous solution containing 0.1 percent (w/v), at a temperature of 80°C, stirred gently (i.e., at 30 – 40 r.p.m.) in a beaker for various periods Table 2

| Phosphate Level (ppm $P_2O_5$) | Attenuation Index ($a^*_{420}$ in m.a.u.) | Colour ($a^*_{420}$ after Millipore filtration in m.a.u.) | Turbidity Index (Attenuation Index − Colour) | Percentage Decolorization |
|---|---|---|---|---|
| 0 | 2308 | 1467 | 841 | — |
| 100 | 1184 | 1115 | 69 | 24 |
| 200 | 1066 | 1045 | 21 | 29 |
| 300 | 978 | 978 | 0 | 33 |
| 400 | 927 | 916 | 11 | 38 |
| 500 | 924 | 877 | 47 | 40 |
| 600 | 889 | 843 | 46 | 43 |

Example 2

The procedure of Example 1 for the purification of sugar liquor was repeated, using the same materials and apparatus under the same conditions, except that a cationic surfactant was added to the liquor at the beginning of the process to precipitate high molecular weight anionic impurities dissolved therein.

The liquor was dosed with 500 ppm (on the basis of sugar solids) of "TALOFLOC" (Trade Mark) cationic surfactant (dioctadecyl dimethyl ammonium chloride).

of time, and then allowed to clarify. The clarification time (i.e., the time required to form a definite interface between the scum and the clarified liquor was measured in each case. The scum volume (as a percentage of the total volume) and the turbidity of the subnatant liquor were also measured in each case, after 15 minutes of clarification, the turbidity was measured in a 4 cm cell, at 900 nm, and expressed in milliabsorbency units.

The results of several runs are shown in Table 4, which also shows, for comparison, the results obtained in two control runs performed without any stirring of the secondary floc-containing liquor before clarification. It is evident, from these results, that retention of the secondary floc in the liquor before clarification gives much lower turbidity values.

Table 4

| Stirring time | Flocculant added | Clarification time (mins) | Scum Volume (%) | Turbidity (m.a.u.) |
|---|---|---|---|---|
| NONE | 5 ppm | 1.0 | 16 | 7 |
|  | 10 ppm | 1.0 | 15 | 7 |
| 30 secs | 5 ppm | 0.7 | 12 | 3 |
|  | 10 ppm | 0.3 | 10 | 3 |
| 1 min | 5 ppm | 0.5 | 11 | 1 |
|  | 10 ppm | 0.3 | 9 | 0 |
| 2 mins | 5 ppm | 1.0 | 12 | 2 |
|  | 10 ppm | 0.3 | 9 | 0 |

Example 4

The procedure of Example 3 was repeated, except that no cationic surfactant was used, phosphatation was carried out at 300 ppm of $P_2O_5$ on the basis of sugar solids, the secondary flocculation temperature was 70°C, and the scum volume and turbidity were measured after a clarification time of 30 minutes.

The results obtained are shown in Table 5, which again shows, for comparison, the results obtained in two control runs performed without any stirring of the secondary floc-containing liquor before clarification. It will be seen that the turbidity values obtained are higher than in the comparable runs of Example 3, (which made use of the cationic surfactant), but nevertheless there is again a sharp fall in turbidity when the secondary floc is retained within the liquor for a period of time before clarification.

Table 5

| Stirring time | Flocculant added | Clarification time (mins) | Scum Volume (%) | Turbidity (m.a.u.) |
|---|---|---|---|---|
| NONE | 5 ppm | 3.0 | 18 | 20 |
|  | 10 ppm | 1.5 | 14 | 17 |
| 30 secs | 5 ppm | 3.5 | 15 | 14 |
|  | 10 ppm | 1.0 | 14 | 7 |
| 1 min | 5 ppm | 4.0 | 16 | 12 |
|  | 10 ppm | 1.0 | 13 | 5 |
| 2 mins | 5 ppm | 6.0 | 19 | 7 |
|  | 10 ppm | 1.0 | 13 | 2 |

Example 5

A 65° Brix sugar melter liquor was clarified following the process of FIG. 1 and using a combined flocculator/clarifier as shown in FIG. 2 in which clarifier chamber 1 had a depth of 4 feet and a diameter of 4 feet and flocculator chamber 8 had a diameter 1.5 feet, stirrer 17 having a diameter of 1 foot.

The liquor, having a temperature of 85° C, was first dosed with 300 ppm, based on sugar solids, of "TALOFLOC" (Trade Mark) cationic surfactant and fed at a rate of 4.15 cubic feet per minute to a primary floc formation stage (102, FIG. 1) where it was subjected to phosphatation using 300 ppm of $P_2O_5$, on the basis of sugar solids. The phosphatated liquor was then aerated (104, FIG. 1) by blowing air into the flowing stream of liquor at various rates, as indicated below. After the aeration step, the aerated liquor was dosed with 8 ppm, based on sugar solids, of TALAFLOTE anionic polyacrylamide flocculating agent, by pumping the agent (in the form of an aqueous solution containing 0.1 percent w/v of the agent), into the liquor stream, to initiate secondary floc formation. The dosed liquor then flowed to the flocculator/clarifier in which the stirrer was rotated at various speeds, as indicated below, and the scum scraper was rotated, by independent driving means, at a rate of 1 r.p.m.

The turbidity of the clarified liquor emerging from the separator chamber was measured as described in Example 1.

In one series of experiments the stirrer was rotated at various rates (as shown in Table 6 below) whilst introducing air into the liquor in the aeration step at a rate of 1.0 litre/minute. The results obtained are shown in Table 6.

Table 6

| Rate of Rotation of Stirrer (r.p.m.) | Turbidity |
|---|---|
| 0 | 42 |
| 10 | 42 |
| 20 | 38 |
| 30 | 36 |
| 40 | 20 |
| 50 | 10 |
| 60 | 18 |

In another series of experiments the stirrer was rotated at 60 r.p.m. whilst varying the rate of aeration as shown in Table 7 below, which also shows the effect of the rate of aeration on the liquor in the flocculator.

Table 7

| Aeration rate (litres/minute) | Effect on liquor in flocculator | Turbidity |
|---|---|---|
| 0 | Quiescent flocculation | 20 |
| 0.5 | do. | 20 |
| 1.0 | do. | 18 |
| 1.5 | Agitation in plocculator | 25 |
| 2.0 | do. | 28 |
| 7.2 | Markedly increased agitation | 50 |

In the experiments, the best, i.e., lowest, scum volume noted, was about 6 percent.

We claim:

1. Apparatus for separating flocculated solids from a liquid by flotation-clarification, which comprises, in combination:

a separator chamber in the form of a cylindrical open-topped tank;

a flocculator chamber in the form of an open-topped tank having a circular cross-section of diameter smaller than that of the separator chamber, located coaxially within the separator chamber and extending at least to the same height as the separator chamber;

inlet means for floc-containing liquid located at the bottom of the flocculator chamber;

mechanical agitating means for floc-containing liquid located within the flocculator chamber;

means for directing floc-containing liquid to flow with minimal agitation and shear downwardly from the top of the flocculator chamber into the body of the separator chamber, said means comprising an anti-shear lip around the open top of the flocculator chamber and a surrounding annular sleeve of diameter intermediate between those of the separator chamber and flocculator chamber, extending from above the height of the flocculator chamber to below the level of the antishear lip;

outlet means for clarified liquid located at the bottom of the separator chamber;

a trough surrounding the top of the separator chamber;

means for transferring floating flocculated solids from the top of the separator chamber to the trough;

and solids outlet means located at the bottom of the trough.

2. Apparatus according to claim 1, wherein said means for transferring the floating flocculated solids from the top of the separator chamber to said trough comprises a rotatable blade.

3. Apparatus according to claim 1, wherein said mechanical liquid agitating means comprises a rotary stirrer located within the flocculator chamber.

4. Apparatus according to claim 1, wherein said mechanical liquid agitating means comprises a plurality of static baffles located within the flocculator chamber.

5. Apparatus according to claim 1, wherein the separator chamber has a depth of not more than 5 feet.

6. Apparatus according to claim 1, wherein the flocculator chamber has a height to diameter of at least 2:1.

7. Apparatus according to claim 1, wherein the flocculator chamber has a height to diameter of at least 3:1.

8. Apparatus for separating flocculated solids from a liquid by flotation-clarification which comprises in combination: a separator chamber; a flocculator chamber centrally located within the separator chamber; a trough surrounding the top of the separator chamber; floc-containing liquid inlet means located at the bottom of the flocculator chamber; mechanical agitating means located within the flocculator chamber; means for directing floc-containing liquid to flow with minimum agitation and shear downwardly from the top of the flocculator chamber into the separator chamber; means for transferring floating flocculated solids from the top of the separator chamber to the trough; and solids outlet means located at the bottom of the trough, wherein said means for directing floc-containing liquid flow with minimal agitation from the top of the flocculator chamber into the separator chamber comprises an annular sleeve surrounding the upper part of said flocculator chamber and an anti-shear lip around the upper end of said flocculator chamber.

* * * * *

PO-1050
(5/69)

UNITED STATES PATENT OFFICE
CERTIFICATE OF CORRECTION

Patent No. 3,834,541     Dated September 10, 1974

Inventor(s) John Trethowan Rundell et al

It is certified that error appears in the above-identified patent and that said Letters Patent are hereby corrected as shown below:

This patent issued on September 10, 1974.

Signed and sealed this 3rd day of December 1974.

(SEAL)
Attest:

McCOY M. GIBSON JR.
Attesting Officer

C. MARSHALL DANN
Commissioner of Patents